(12) United States Patent
Sun et al.

(10) Patent No.: US 8,936,742 B2
(45) Date of Patent: Jan. 20, 2015

(54) INTEGRATABLE ASSISTED COOLING SYSTEM FOR PRECISION EXTRUSION DEPOSITION IN THE FABRICATION OF 3D SCAFFOLDS

(75) Inventors: Wei Sun, Cherry Hill, NJ (US); Qudus Hamid, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 374 days.

(21) Appl. No.: 13/243,226

(22) Filed: Sep. 23, 2011

(65) Prior Publication Data

US 2012/0080814 A1 Apr. 5, 2012

Related U.S. Application Data

(60) Provisional application No. 61/387,376, filed on Sep. 28, 2010.

(51) Int. Cl.
*B29C 47/88* (2006.01)
*B29C 35/04* (2006.01)
*B29C 67/00* (2006.01)
*B29C 35/16* (2006.01)
*B29C 47/00* (2006.01)

(52) U.S. Cl.
CPC ........... *B29C 47/8815* (2013.01); *B29C 35/045* (2013.01); *B29C 67/0055* (2013.01); *B29C 2035/1658* (2013.01); *B29C 47/0014* (2013.01); *B29C 2035/1683* (2013.01); *B29C 2947/92704* (2013.01); *B29C 2947/92923* (2013.01); *B29C 2947/92942* (2013.01)
USPC .................. 264/211.14; 425/378.1

(58) Field of Classification Search
None
See application file for complete search history.

(56) References Cited

U.S. PATENT DOCUMENTS

| | | | | |
|---|---|---|---|---|
| 4,850,836 A * | 7/1989 | Maeda et al. | ................. | 425/72.2 |
| 5,976,431 A * | 11/1999 | Mears | .......................... | 264/40.1 |
| 6,572,798 B2 | 6/2003 | Nitschke et al. | | |
| 6,824,372 B2 * | 11/2004 | Berrigan et al. | ............. | 425/72.2 |
| 7,559,487 B2 * | 7/2009 | Gressett et al. | ................... | 239/1 |
| 8,178,015 B2 * | 5/2012 | Harris et al. | ................... | 264/103 |
| 8,639,484 B2 | 1/2014 | Sun et al. | | |
| 8,735,117 B2 | 5/2014 | Darling et al. | | |
| 2001/0033037 A1 * | 10/2001 | Nitschke et al. | ............. | 264/40.3 |
| 2006/0195179 A1 | 8/2006 | Sun et al. | | |
| 2008/0020049 A1 | 1/2008 | Darling et al. | | |
| 2008/0145639 A1 | 6/2008 | Sun et al. | | |

OTHER PUBLICATIONS

Barron, et al., "Biological laser printing: a novel technique for creating heterogeneous 3-dimensional cell patterns." 2004, Biomed Microdevices 6(2):139-47.

(Continued)

*Primary Examiner* — Benjamin Schiffman
(74) *Attorney, Agent, or Firm* — Saul Ewing LLP; Kathryn Doyle; Brian R. Landry

(57) ABSTRACT

The present invention relates to an integrated Assisting Cooling (AC) device, system and method for use with PED devices, allowing use of biopolymers having higher melting points in the fabrication of 3D scaffolds. The AC device cools the filament as it is extruding from the nozzle via low flow convective cooling. The AC device allows for cooling in the +/− direction of motion on an XY plane. The AC device elevates with the material delivery chamber. The AC device allows for scaffold fabrication at applied temperatures as high as about 250° C.

23 Claims, 7 Drawing Sheets

(56) References Cited

OTHER PUBLICATIONS

Boland, et al., "Cell and organ printing 2: fusion of cell aggregates in three-dimensional gels." 2003, Anat Rec A Discov Mol Cell Evol Biol.;272(2):497-502.

Ciocca, et al., "CAD/CAM and rapid prototyped scaffold construction for bone regenerative medicine and surgical transfer of virtual planning: a pilot study." 2009, Comput Med Imaging Graph, 33(1):58-62.

Darling, et al., "3D microtomographic characterization of precision extruded poly-epsilon-caprolactone scaffolds." 2004, J Biomed Mater Res Part B Appl Biomater 70B:311-317.

Griffith, et al., "Tissue engineering—current challenges and expanding opportunities." 2002, Science, 295:1009-1014.

Khalil, et al., "Multi-nozzle deposition for construction of 3D biopolymer tissue scaffolds." 2005, Rapid Prototyping Journal, 11(1):1355-2546.

Murray, et al., "Regenerative endodontics: a review of current status and a call for action." 2007, J Endod, 33(4):377-90.

Wang et al., "Precision extruding deposition and characterization of cellular poly-caprolactone tissue scaffolds" 2004, Rapid Prototyping Journal, 10(1):42-49.

Zhou, et al., "Electrowetting-based multi-microfluidics array printing of high resolution tissue construct with embedded cells and growth factors." 2007, Virtual and Physical Prototyping, 2(4):217-223.

Hamid et al., "Fabrication of three-dimensional scaffolds using precision extrusion deposition with an assisted cooling device," 3 Biofabrication 034109 (2011).

Hamid et al., "Precision Extrusion Deposition with Integrated Assisting Cooling to Fabricate 3D Scaffolds," in Proceedings of the ASME 2010 Conference on Smart Materials, Adaptive Structures and Intelligent Systems (2010).

Shor et al., "Precision Extrusion Deposition of Polycaprolactone/Hydroxyapatite Tissue Scaffolds" (2006).

Shor et al., "Precision Extruding Deposition for Freeform Fabrication of PCL and PCL-HA Tissue Scaffolds," Printed Biomaterials 91-110 (2009) (abstract only).

\* cited by examiner

INTEGRATABLE ASSISTED COOLING SYSTEM FOR PRECISION EXTRUSION DEPOSITION IN THE FABRICATION OF 3D SCAFFOLDS

CROSS REFERENCE TO RELATED APPLICATIONS

The present application is entitled to priority under 35 U.S.C. §119(e) to U.S. Provisional Application No. 61/387,376, filed Sep. 28, 2010, which application is hereby incorporated by reference herein in its entirety.

BACKGROUND OF THE INVENTION

The loss or failure of an organ or tissue is one of the most devastating and costly problems in human health care. In the United States alone, as many as twenty million patients per year suffer from various organ and tissue related maladies caused by burns, skin ulcers, diabetes, and connective tissue defects, such as bone and cartilage damage. More than eight million surgical procedures are performed annually to treat these cases, Further, over 70,000 people are on transplant waiting lists, and an additional 100,000 patients die each year due to the lack of appropriate organs (The Organ and Transplantation Network, 2004; http://www.ustransplant.org). The financial cost to care for these patients has been estimated to be as much as $400 billion annually (Langer, 1993, Science 26: 920-6). Tissue engineering, which integrates a variety of science and engineering disciplines to create functional tissues and organs for transplantation, has been evolving into one of the most promising therapies in regenerative medicine (Patrick, C. W. Jr, Mikos, A. G., McIntire, L. V., 1998, "Frontiers in Tissue Engineering", Elsevier Science Ltd.).

Physicians and researchers study in vivo tissue composition and cellular orientation to characterize critical mechanisms of tissue and organ systems (Gabbay, et al., 2006, Annals of Plastic Surgery, 57(1):89-93; Alini, et al., 2008, European Spine Journal, 17(1): 2-19). This body of knowledge assists in defining healthy tissue, such that a template can be formulated to conceptually design replacement tissue from basic biological building blocks using in vitro manufacturing (Boland, et al., 2003, The Anatomical Record Part A: Discoveries in Molecular, Cellular, and Evolutionary Biology, 272A(2):497-502; Griffith, et al., 2002, Science, 295: 1009-1014; Zhou, et al., 2007, Virtual and Physical Prototyping, 2(4):217-223). Biomodeling is the engineered combination of physical components into a specific spatial construction in a flexible digital workspace. The goal of biomodeling is to leverage geometric positioning and proximity of specific biologics to bring functional abilities to cell aggregates (Murray, et al., 2007, J Endod, 33(4):377-90; Ciocca, et al., 2009, Comput Med Imaging Graph, 33(1):58-62; Barron, et al., 2004, Biomed Microdevices 6(2):139-47). Model parameters are subject to engineered manipulation and refinement. Using this control, best estimates of biological tissue can be generated.

The field of tissue engineering continues to make significant advances towards its ultimate goal of engineering a fully functional organ. For example, scaffold guided tissue engineering may now include the fabrication of extra-cellular matrices (ECM) that have the capabilities to maintain cell growth, cell attachment, and the ability to form new tissues. Three dimensional scaffolds often address multiple mechanical, biological and geometrical design constraints. Additionally, Computer Aided Tissue Engineering (CATE) has seen significant development in solid freeform fabrication (SFF) processes, including the fabrication of tissue scaffolds with precision control. For example, Precision Extrusion Deposition (PED) devices use computer aided motion and extrusion to precisely fabricate the internal and external architecture, porosity, pore size, and interconnectivity within the scaffold. The high printing resolution, precision, and controllability of the PED allows for closer mimicry of tissues and organs.

However, the demands of these technological advances also demand advances in the systems and equipment that support and enable the evolution of tissue engineering. For example, some cells prefer scaffolds built from stiff material, and stiff materials typically have a high melting point. While desirable, these biopolymers with high melting points have proven to be difficult to manipulate in the fabrication of 3D scaffolds. Thus, there is a need in the art for a device and system that allows for the extrusion of higher melting point materials in the fabrication of 3D scaffolds. The present invention satisfies this need.

BRIEF SUMMARY OF THE INVENTION

The invention includes a device for cooling a polymer filament extruded from a polymer extruder. The device includes: a flow line comprising a continuous loop having a hollow interior, at least one inlet providing access to the hollow interior of the continuous loop, and a plurality of outlets also accessing the hollow interior of the continuous loop; a mounting structure for attaching the device to the polymer extruder; and at least one support connector for securely attaching the flow line to the mounting structure; wherein the plurality of outlets are angled in a direction towards the polymer filament when extruded from the polymer extruder, such that when a cooling medium is introduced into hollow interior of the continuous loop of the flow line via the at least one inlet, and wherein the cooling medium exits the flow line via the plurality of outlets, the cooling medium is directed towards the polymer filament being extruded from the polymer extruder.

In one embodiment, the device cools the filament as it is extruding from the nozzle via low flow convective cooling. In another embodiment, the device cools in the +/− direction of motion on an XY plane. In yet another embodiment, the device elevates with the material delivery chamber of the polymer extruder, In yet another embodiment, the cooling medium is a gas. In yet another embodiment, the gas includes nitrogen.

The invention further includes a system for cooling a polymer filament extruded from a polymer extruder. The system includes: a flow line comprising a continuous loop having a hollow interior, at least one inlet providing access to the hollow interior of the continuous loop, and a plurality of outlets also accessing the hollow interior of the continuous loop; a mounting structure for attaching the device to the polymer extruder; and at least one support connector for securely attaching the flow line to the mounting structure; and a cooling medium introduced into the hollow interior of the flow line via the at least one inlet, such that the cooling medium travels through the continuous loop and exits through the plurality of outlets in the direction of the polymer filament being extruded from the polymer extruder.

In one embodiment, the plurality of outlets are directionally angled towards the polymer filament being extruded from the polymer extruder. In another embodiment, the system cools the filament as it is extruding from the nozzle via low flow convective cooling. In yet another embodiment, the system cools in the +/− direction of motion on an XY plane. In yet another embodiment, the system elevates with the material delivery chamber of the polymer extruder. In yet another embodiment, the cooling medium is a gas. In yet another embodiment, the gas includes nitrogen.

The invention further includes a method of fabricating scaffolds from polymers having a high melting point. The method includes: adding at least one polymer having a melting point of at least about 120° C. to a polymer extruding device; melting the at least one polymer in the polymer extruding device and maintaining the at least one polymer in a fluid state as the at least one polymer moves through the polymer extruding device; extruding the at least one polymer from the polymer extruding device as a filament; and cooling the filament with a cooling device as the filament is extruded from the polymer extruding device; wherein the scaffold includes the cooled filament.

In one embodiment, the cooling device includes: a flow line comprising a continuous loop having a hollow interior, at least one inlet providing access to the hollow interior of the continuous loop, and a plurality of outlets also accessing the hollow interior of the continuous loop; a mounting structure for attaching the device to the polymer extruding device; and at least one support structure for securely attaching the flow line to the mounting structure; wherein the plurality of outlets are angled in a direction towards the polymer filament when extruded from the polymer extruding device.

In another embodiment, cooling the filament further includes introducing a cooling medium into the cooling device via the at least one inlet, such that the cooling medium is directed towards the polymer filament via the plurality of outlets. In yet another embodiment, filament is cooled as it is extruding from the nozzle via low flow convective cooling. In yet another embodiment, the cooling is in the +/− direction of motion on an XY plane. In yet another embodiment, the cooling device elevates with the material delivery chamber of the polymer extruding device. In yet another embodiment, the cooling medium is a gas. In yet another embodiment, the gas includes nitrogen. In yet another embodiment, the melting temperature of the at least one polymer is at least about 140° C. In yet another embodiment, the melting temperature of the at least one polymer is at least about 160° C. In yet another embodiment, the melting temperature of the at least one polymer is at least about 180° C. In yet another embodiment, the melting temperature of the at least one polymer is at least about 200° C.

BRIEF DESCRIPTION OF THE FIGURES

For the purpose of illustrating the invention, there are depicted in the drawings certain embodiments of the invention. However, the invention is not limited to the precise arrangements and instrumentalities of the embodiments depicted in the drawings.

FIG. 10, comprising

DETAILED DESCRIPTION

The present invention relates to an integrated Assisting Cooling (AC) device, system and method for use with PED devices, allowing use of biopolymers having higher melting points in the fabrication of 3D scaffolds. The AC device cools the filament as it is extruding from the nozzle via low flow convective cooling. The AC device allows for cooling in the +/− direction of motion on an XY plane. The AC device elevates with the material delivery chamber. The AC device allows for scaffold fabrication at applied temperatures as high as about 250° C.

Figure 1:
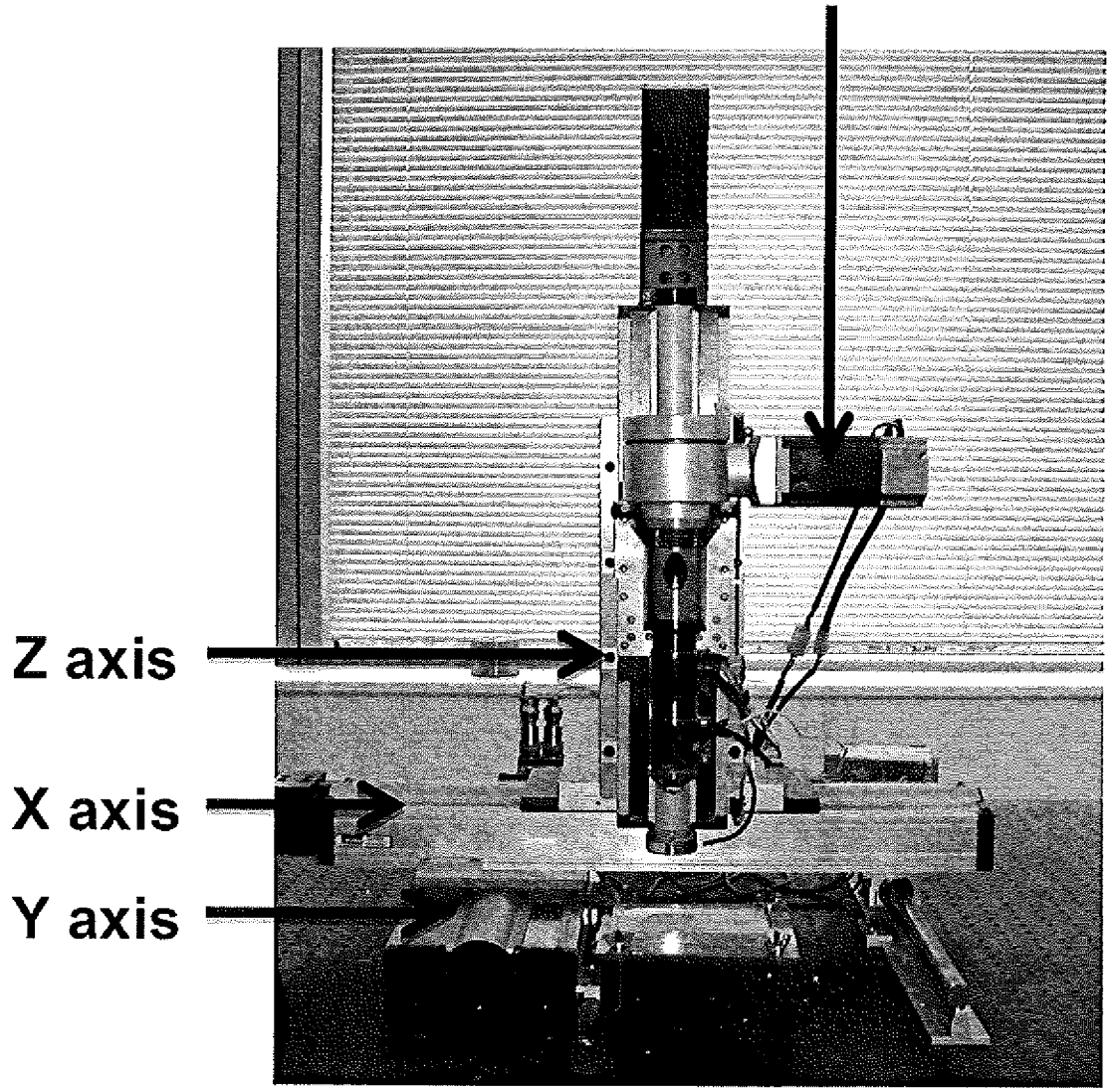
FIG. 1 is a schematic of a PED device and its various components.
Figure 2:
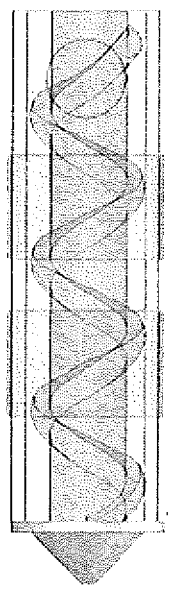
FIG. 2 is a schematic of the PED's material delivery system.
Figure 3:
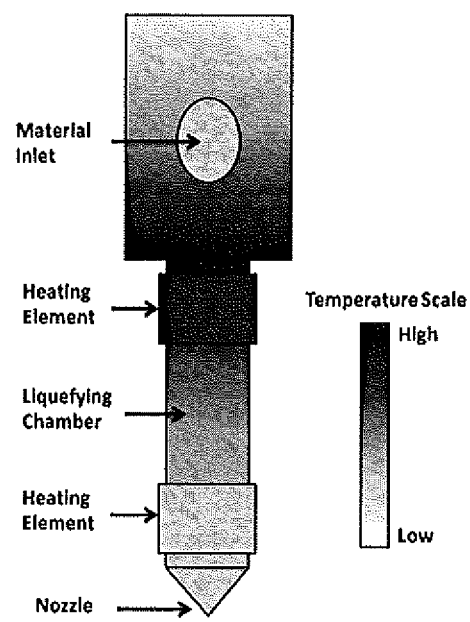
FIG. 3 is a schematic depicting a typical temperature gradient across the PED's material delivery system.

According to an aspect of the present invention, the AC device may be integrated with a Precision Extrusion Deposition (PED) device, an example of which is depicted in FIG. 1. It should be appreciated that the AC device of the present invention may be integrated with any polymer extruder as would be understood by those skilled in the art. As contemplated herein, a PED device utilizes three major components: 1) Material Delivery; 2) 3D Motion; and 3) Computer Aided Modeling. The material delivery component includes interchangeable nozzles, multiple heating elements, and a precision drive screw. The heating elements heat the material to a process temperature. The precision screw drives the material through the material delivery chamber to the nozzle for extrusion. A schematic view of the material delivery system along with its temperature gradient across the PED is depicted in FIGS. 1-3, The 3D motion is governed with linear servo that permits the PED to move in the X, Y, and Z +/− directions. The computer aided modeling component of the PED enables a user to model three-dimensional structures accordingly (Wang et al., 2004, Rapid Prototyping Journal, 10(1):42-49; Darling, et al., 2004, J Biomed Mater Res Part B Appl Biomater 70B:311-317; Khalil, et al., 2005, Rapid Prototyping Journal, 11(1):1355-2546).

As shown in FIG. 3, there are two heating elements that control the temperature along the material delivery chamber. The top heating element (heating element 1) is located at the inlet of the chamber, and the bottom heating element (heating element 2) is located at the nozzle. The primary goal of the first heating element is to apply heat to the polymer until it changes phase from solid to liquid. The second heating element then maintains the polymer viscosity through the chamber until the polymer is extruded. Thus, heating element 1 generally operates at a higher temperature in comparison to heating element 2, because it takes more energy to change the polymer phase from solid to liquid. Not only is the first heating element responsible for phase changes, it is also responsible for establishing the appropriate level of viscosity necessary for extrusion of cylindrical filaments. Once the first heating element completes its task, the second heating element maintains the required viscosity throughout the chamber. This typically requires less energy in comparison to the first heating element.

The velocity, acceleration, and deceleration of the X, Y, and Z axis are independent of each other. However, the extrusion speed (sometimes called the 4th axis) of the polymer or working material is proportional to the velocity of the motion. Depending on the viscosity of the working material, the proportional gain must be adjusted accordingly to produce a smooth flow (no overflow or underflow of materials) of filaments as the PED builds the three-dimensional structures. Further examples of PED devices can be found in U.S. patent application publication numbers 20060195179 and 20080020049, the entire disclosures of which are incorporated by reference herein as if each is set forth herein in its entirety. It should be appreciated that the AC device of the present invention is suitable for integration with any PED device as would be understood by those skilled in the art.

Figure 4:
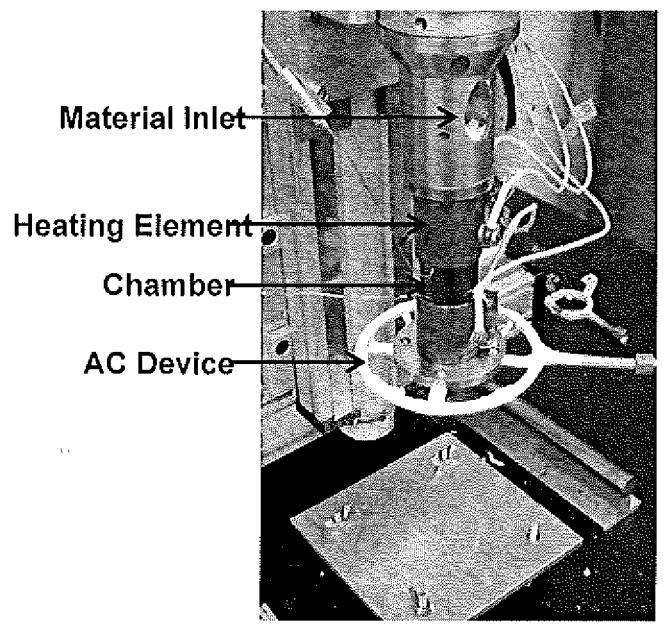
FIG. 4 depicts an exemplary AC device mounted onto the delivery chamber portion of the PED device.
Figure 5:
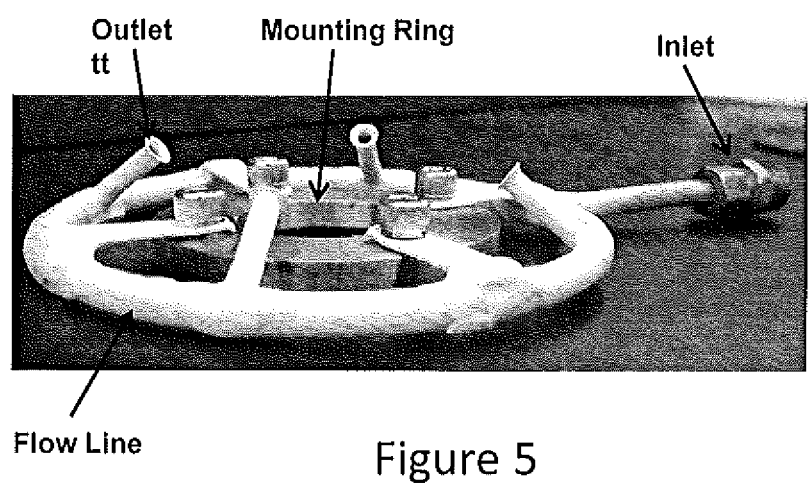
FIG. 5 depicts the various components of the exemplary AC device of FIG. 4.

Referring now to FIGS. 4 and 5, the AC device of the present invention can be integrated onto the PED, such that the polymer filaments are cooled (via conductive and/or convective cooling) as they are extruded from the nozzle. Importantly, the present invention accomplishes this without significantly manipulating the material delivery chamber temperature, without inducing rapid cooling, or without deforming the extruded filament structures. As shown in FIGS. 4 and 5, the AC device may be mounted at or near the nozzle of the PED where the heat from the material delivery chamber of the PED has minimal influence on the temperature of the cooling medium within the AC device, The AC device cools the filament as it is extruding from the nozzle via low flow convective cooling. The AC device allows for cooling in the +/− direction of motion on an XY plane. The AC device elevates with the material delivery chamber. The AC device allows for scaffold fabrication at applied temperatures as high as about 250° C.

The AC device of the present invention allows for the fabrication of scaffolds from high melting point polymers that demonstrate improved mechanical properties, structural integrity, and precision of pore sizes and interconnectivity. For example, without integration of the AC device of the present invention, only biopolymers having melting points of no greater than about 120° C. could be used to construct a scaffold. However, utilization of the integrated AC device allows the fabrication of scaffolds using biopolymers having melting points of greater than about 120° C. In particular embodiments, the present invention allows for extrusion of biopolymers or polymer combinations having melting points of at least about 125° C., about 130° C., about 135° C., about 140° C., about 145° C., about 150° C., about 160° C., about 170° C., about 180° C., about 190° C., about 200° C., about 210° C., about 220° C., about 230° C., about 240° C., or even as high as about 250° C.

The AC device must cool the polymer at the beginning of the fabrication process (the lower layers of the scaffold) as well as the later stages of the fabrication process, including the center and upper layers of the scaffold. To accomplish this, the AC device includes directional cooling points (outlets) and further moves with the nozzle, such that the AC device adjusts accordingly as the scaffold is being fabricated.

Figure 6:
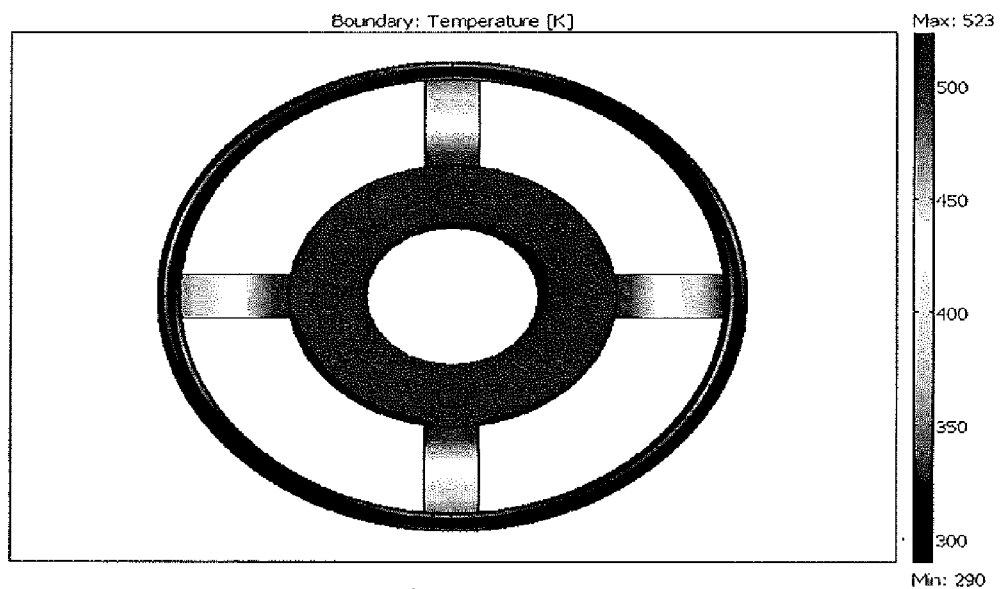
FIG. 6 depicts the top view of COMSOL simulation results.
Figure 7:
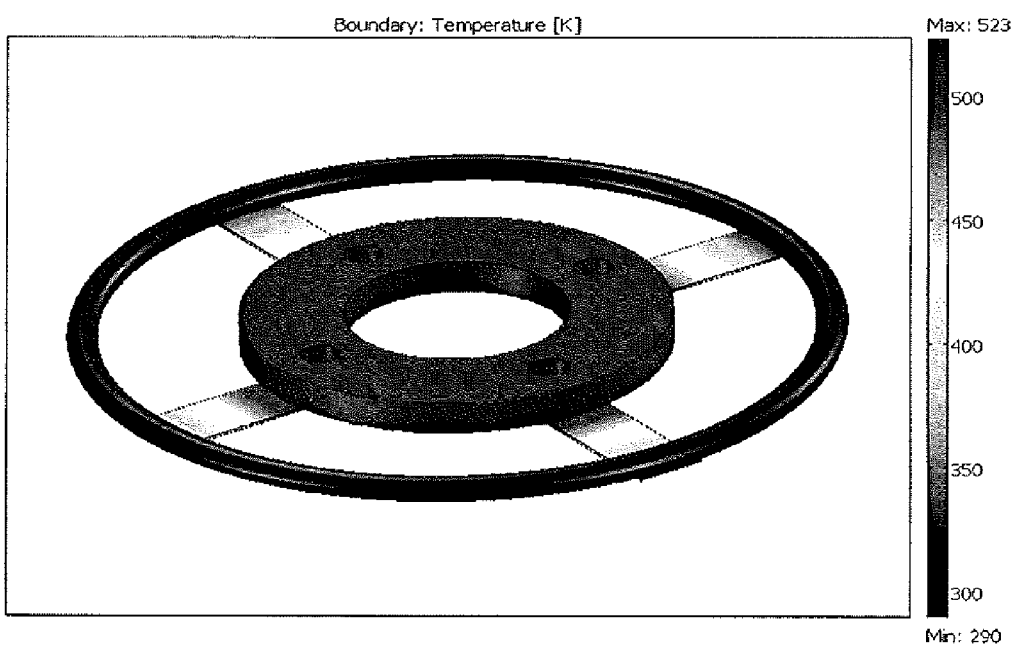
FIG. 7 depicts an isometric view of COMSOL simulation results.

Referring again to FIGS. 4 and 5, the AC device of the present invention is generally ring-shaped, although the device is not limited to any particular shape. The AC device includes an inner mounting ring having a diameter suitable for attachment to the PED device. General attachment of the mounting ring to the PED may be accomplished in any mechanical manner as would be understood by those skilled in the art. The AC device also includes a hollow outer ring that functions as a flow line for handling the flow or circulation of cooling medium. The hollow outer ring (or flow line) is attached to the inner mounting ring by a suitable number of support connectors. The number and placement of such support connectors will vary based on the materials used to compose the inner mounting ring, the flow line, and the support connectors themselves. Further, as shown in FIGS. 6 and 7, the support connectors also function as "heat fins", thereby significantly reducing the transfer of heat from the mounting ring to the flow line.

Connected to the flow line is at least one inlet for attachment and/or engaging the equipment used for holding and delivering the cooling medium to the AC device. Additional inlets may be used to accommodate the introduction of multiple and/or different cooling mediums, if needed. Also connected to the flow line is at least one cooling outlet for the at least partial release of cooling medium. These cooling outlets serve as cooling points in the cooling of extruded polymer filaments. For example, the AC device may include one or multiple cooling points for cooling in each direction of motion on an XY plane. In one embodiment, the device has four cooling points, located substantially equidistant from each other to promote even cooling. It should be appreciated that any number of cooling points may be used, and any positioning or configuration of these cooling points on the AC device and around the PED may be used, provided such cooling point number and configuration sufficiently cools the extruded polymer filaments. The at least one inlet, flow line, and cooling outlets may further include any number of valves (not shown) for manually or automatically reducing or shutting off the flow of cooling medium in a controlled or programmable manner. The AC device may be fabricated using any suitable materials as would be understood by those skilled in the art. For example, the AC device may be composed of one or more metals, such as stainless steel and/or brass. The AC device may further include any sort of insulated layer or covering to keep the cooling medium at a desired temperature.

The AC device of the present invention may use any type or combination of cooling mediums, including liquid and/or gaseous mediums, for cooling polymer filaments extruded from the PED. For example, and without limitation, such gaseous mediums may include nitrogen, compressed air, oxygen, helium, or carbon dioxide. Liquid mediums may include, without limitation, water (DI water, sterilized water, chilled, etc), liquid nitrogen, refrigerants, and chilled cell culture mediums.

The present invention also includes a method of fabricating scaffolds comprising polymers having high melting points. The method includes the steps of adding at least one polymer having a melting point of at least about 120° C. to a PED device, melting the at least one polymer and maintaining the fluid state of the at least one polymer as the at least one polymer moves through the PED device, extruding the at least one polymer from the PED device as a filament, cooling the filament with an AC device as it is extruded from the PED device, and fabricating the scaffold from the extruded filament.

EXAMPLES

The invention is now described with reference to the following Examples. These Examples are provided for the purpose of illustration only, and the invention is not limited to these Examples, but rather encompasses all variations which are evident as a result of the teachings provided herein.

Example 1

AC Device Fabrication

In one embodiment of the present invention, the AC device is fabricated from primarily two materials: stainless steel and brass. The mounting ring's inner diameter is about 2.75", while the outer diameter is about 4.35", and the thickness of the ring is about 0.25". The four mechanical supports connecting the flow lines to the mounting ring are made from brass. The flow line is hollow (to provide adequate flow and/or circulation of cooling medium) and is made from brass. The diameter of the flow line is about 0.25" and the max diameter of the flow line (diameter of the flow line around the mounting ring) is approximately 4.50". There are four outlets connected to the flow line. These outlets function as cooling points, and provide directional and substantially even distribution of the cooling medium. The outlets are approximately 1.00" in length and have a diameter of about 0.125". The inlet of the AC device is also constructed from brass. The inlet has the same diameter as the flow line, and is about 3.00" long with an NPT connector for easy connection, All joints/welds are fastened and sealed with JB Weld Epoxy.

Example 2

COMSOL Simulation

COMSOL Multiphysics 3.5a were used to simulate the heat transfer through each component of the AC device described in Example 1. Equation 1 was used in the module simulation of conduction and convection at steady state temperature (Incropera, F. P., DeWitt, D. P., 2007, "Fundamentals of Heat and Mass Transfer", John Wiley, ISBN 0471457280).

$$q_x = kA \frac{\Delta T}{\Delta x} \quad (1)$$

The results of COMSOL simulation are depicted in FIGS. 6 and 7 (top and isometric views). As seen in FIGS. 6 and 7, the mounting ring's inner surfaces were applied with a maximum temperature of about 523 K. After conclusion of the COMSOL's simulation, the temperature was uniformly distributed on the mounting ring, however, the temperature decreased (from mounting ring to flow line) on the mechanical supports. The decrease in temperature on the mechanical supports was likely due to: (1) the cooling effect from the working medium from the flow line; (2) the cooling effect of the ambient air; and (3) the small scale of the mechanical supports allowing for faster cooling. According to the COMSOL simulation, at the maximum working temperature of the PED device (about 523K), the temperature of the working (or cooling) medium was not affected. Thus, the COMSOL simulation showed the flow line has a temperature gradient of about 290K. The COMSOL simulation was conducted with the effect of the working medium.

Example 3

Scaffold Fabrication and Cell Assay

7F2 cells were seeded onto 75 cm$^2$ vented flasks and incubated. 6 hours after the cells were seeded, the culture medium was changed to remove any dead cells in the flask. Culture medium was also changed every 2-3 days until flask are ready to be harvested. Confluent flasks were harvested and counted using a hemocytometer. Harvested cells were centrifuged and media was removed from the cell pallet. Cell pallet was used to deliver a cell suspension solution with a cell density of about $1 \times 10^6$ cell/ml to the fabricated scaffolds.

Figure 8:
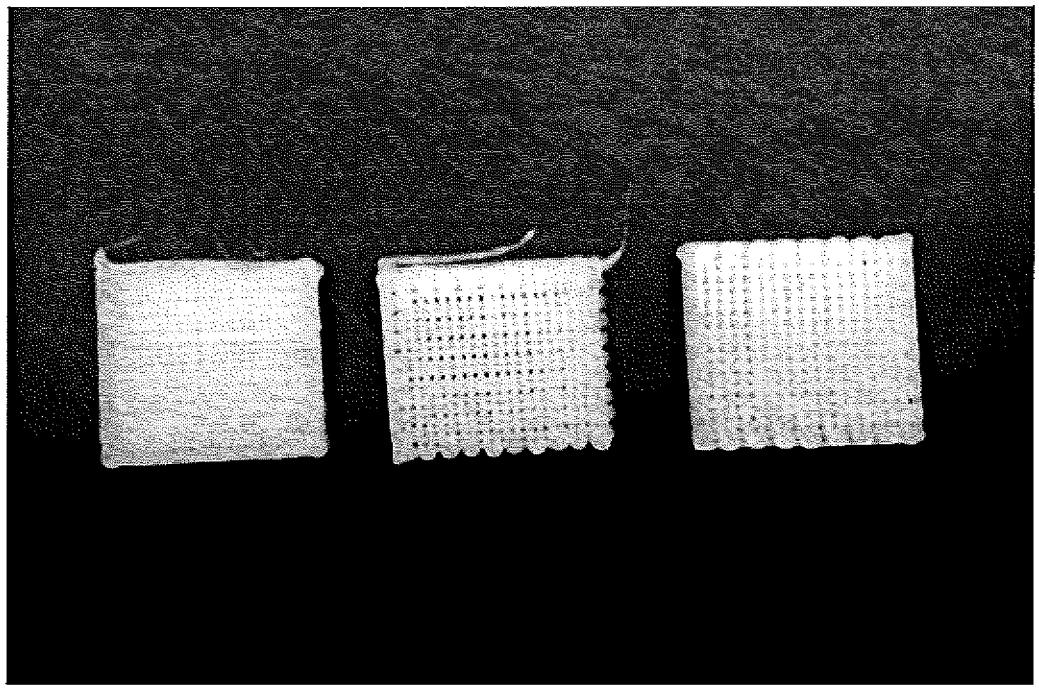
FIG. 8 depicts a top view of various fabricated scaffolds using the integraded AC device, where the pore sizes of the scaffolds are about 200 µm, 350 µm, 500 µm (left to right).
Figure 9:
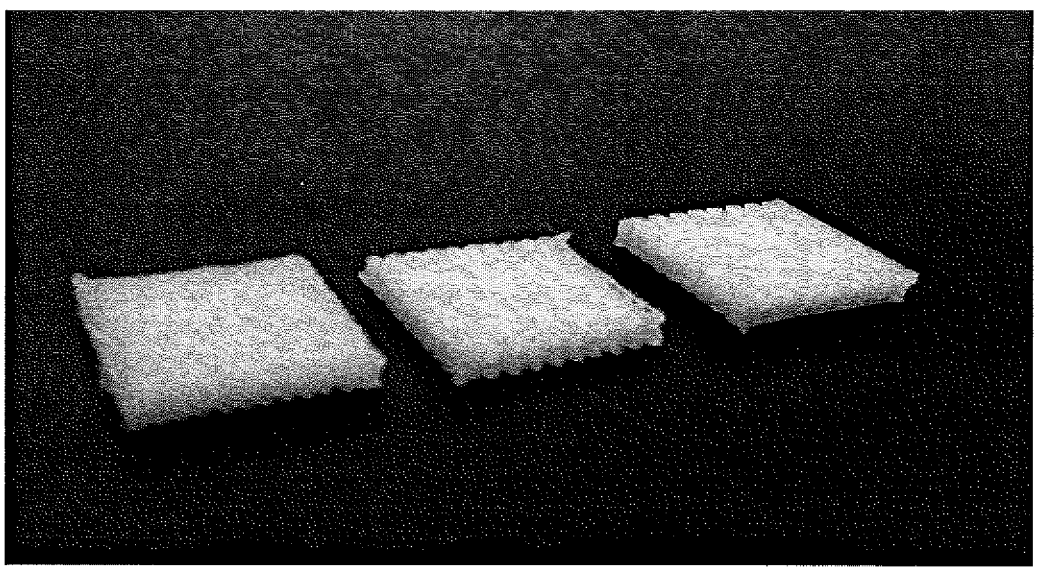
FIG. 9 depicts an isometric view of fabricated scaffold using the integraded AC device, where the pore sizes of the scaffolds are about 200 µm, 350 µm, 500 µm (left to right).
Figure 10A:
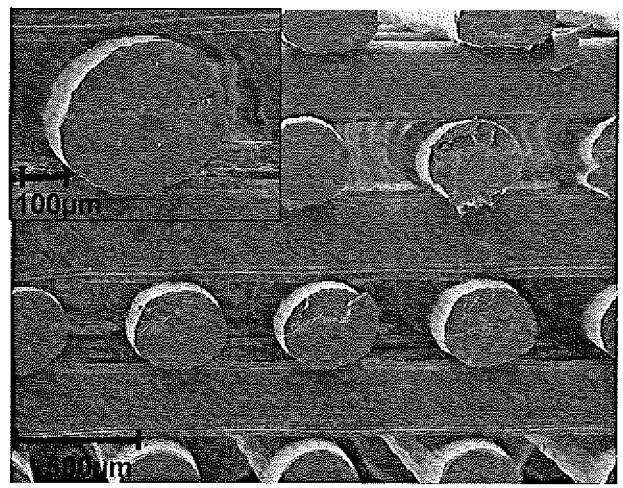
FIGS. 10A and 10B, depict the architectural integrity and the 0°/90° filament orientation of the resulting scaffolds fabricated using the AC device of the present invention. Samples were sectioned by freezing in liquid nitrogen then cut razor sharp. The images of FIGS. 10A and 10B were taken using a FEI/Philips XL-30 Field Emission Environmental Scanning Electron Microscope.
Figure 10B:
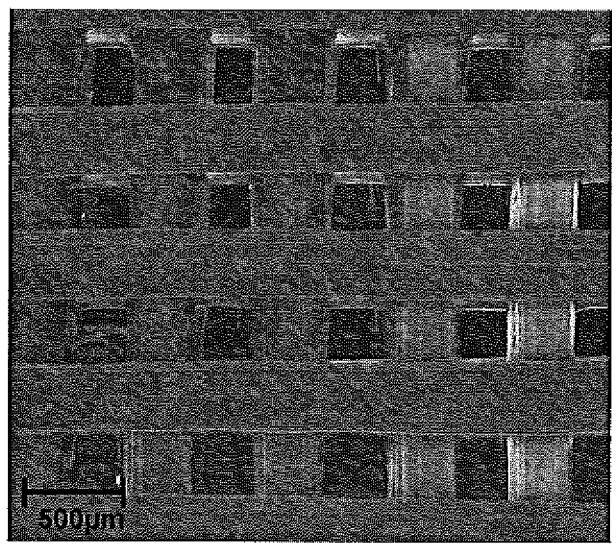

A high melting point polymer was loaded into the material delivery chamber where the heating element 1 was set to about 140° C. and heating element 2 was set to 120° C. The AC device was activated, using nitrogen (gaseous) as the working or cooling medium. After the polymer was fully loaded in the delivery chamber, computer software programs were written and executed to fabricate three scaffolds. The scaffold dimensions were about 15 mm×15 mm×3 mm, and the pore sizes were about 150 μm, 350 μm, and 500 μm, respectively (see Table 1 and FIGS. 8 and 9). The fabricated scaffolds were sterilized in 70% ethanol. As depicted in FIGS. 10A-10E, the structural and architectural integrity of the scaffolds (FIG. 10A), including the 0°/90° filament orientation (FIG. 10B) can be visualized by electron microscopy.

| Scaffold 1 | Scaffold 2 | Scaffold 3 |
|---|---|---|
| 0°/90° filament orientation | 0°/90° filament orientation | 0°/90° filament orientation |
| 350 μm filament size | 350 μm filament size | 350 μm filament size |
| 200 μm pore size | 350 μm pore size | 500 μm pore size |
| Dimension: (10 × 10 × 5) mm | Dimension: (10 × 10 × 5) mm | Dimension: (10 × 10 × 5) mm |
| $V_T$ = 500 mm$^3$ | $V_T$ = 500 mm$^3$ | $V_T$ = 500 mm$^3$ |
| $V_A$ = 257.67 mm$^3$ (51.53%) | $V_A$ = 311.50 mm$^3$ (62.30%) | $V_A$ = 338.45 mm$^3$ (67.69%) |
| $V_P$ = 242.33 mm$^3$ (48.47%) | $V_P$ = 188.50 mm$^3$ (37.70%) | $V_P$ = 161.55 mm$^3$ (32.31%) |
| Extruding temp: 220° C. | Extruding temp: 220° C. | Extruding temp: 220° C. |

Figure 11:
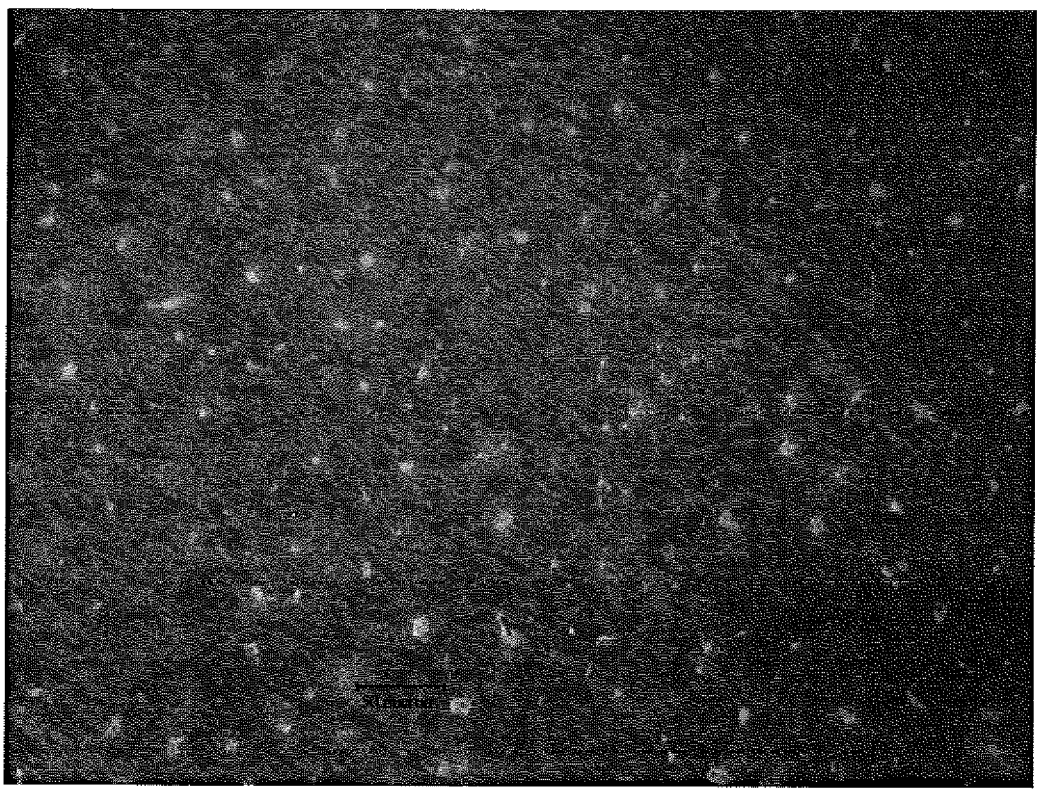
FIG. 11 depicts the BisBENZIMIDE assay results, showing cell nuclei (glowing blue) on a filament of the scaffold (scale bar 50 µm, magnification 20×).

Using a pipette, harvested cells were placed onto the sterile scaffold. Scaffolds with cells were placed in the incubator where a BisBENZIMIDE Assay was later conducted to demonstrate that the scaffolds fabricated utilizing the integrated AC device do in fact support cell survival, attachment, and proliferation. FIG. 11 depicts the results of the BisBENZIMIDE assay, confirming that the scaffolds do support cell survival, attachment and proliferation.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. A device for cooling a polymer filament extruded from a polymer extruder of a precision extrusion deposition system, comprising:
    a flow line comprising a continuous loop having a hollow interior, at least one inlet providing access to the hollow interior of the continuous loop, and a plurality of outlets also accessing the hollow interior of the continuous loop;
    a mounting structure for attaching the device to the polymer extruder, the mounting structure dimensioned for mounting over the polymer extruder without interfacing or interfering with flow of the polymer filament; and at least one support connector for securely attaching the flow line to the mounting structure;

wherein the plurality of outlets are angled towards a central radial axis of the device, such that when a cooling medium is introduced into the hollow interior of the continuous loop of the flow line via the at least one inlet and exits the flow line via the plurality of outlets, the cooling medium is directed towards the central radial axis of the device.

2. The device of claim 1, wherein the device is adapted and configured to cool the polymer filament as it is extruding from the polymer extruder via low flow convective cooling.

3. The device of claim 1, wherein the device cools in the +/− direction of motion on an XY plane.

4. The device of claim 1, wherein the cooling medium is a gas.

5. The device of claim 1, wherein the mounting structure defines a central cylindrical opening.

6. The device of claim 1, wherein the at least one support connector is thermally insulated.

7. The device of claim 1, wherein the plurality of outlets consists of four outlets pointing towards and arranged at right angles about a focal point.

8. The device of claim 1, wherein the focal point lies along the central radial axis of the device.

9. A system for cooling a polymer filament extruded from a polymer extruder of a precision extrusion deposition system, comprising:
 a flow line comprising a continuous loop having a hollow interior, at least one inlet providing access to the hollow interior of the continuous loop, and a plurality of outlets also accessing the hollow interior of the continuous loop;
 a mounting structure for attaching the device to the polymer extruder, the mounting structure dimensioned for mounting over the polymer extruder without interfacing or interfering with flow of the polymer filament; and
 at least one support connector for securely attaching the flow line to the mounting structure; and
 a cooling medium introduced into the hollow interior of the flow line via the at least one inlet, such that the cooling medium travels through the continuous loop and exits through the plurality of outlets towards a central radial axis of the system.

10. The system of claim 9, wherein the system is adapted and configured to cool the polymer filament as it is extruding from the polymer extruder via low flow convective cooling.

11. The system of claim 9, wherein the system cools in the +/− direction of motion on an XY plane.

12. The system of claim 9, wherein the cooling medium is a gas.

13. The system of claim 12, wherein the gas comprises nitrogen.

14. A method of fabricating scaffolds from polymers having a high melting point, the method comprising:
 adding at least one polymer having a melting point of at least about 120° C. to a polymer extruding device of a precision extrusion deposition system;
 melting the at least one polymer in the polymer extruding device and maintaining the at least one polymer in a fluid state as the at least one polymer moves through the polymer extruding device;
 extruding the at least one polymer from the polymer extruding device as a filament; and
 cooling the filament with a cooling device as the filament is extruded from the polymer extruding device, the cooling device comprising:
  a flow line comprising a continuous loop having a hollow interior, at least one inlet providing access to the hollow interior of the continuous loop, and a plurality of outlets also accessing the hollow interior of the continuous loop;
  a mounting structure for attaching the cooling device to the polymer extruder, the mounting structure dimensioned for mounting over the polymer extruder without interfacing or interfering with flow of the polymer filament; and
  at least one support connector for securely attaching the flow line to the mounting structure;
  wherein the plurality of outlets are angled towards a central radial axis of the cooling device, such that when a cooling medium is introduced into the hollow interior of the continuous loop of the flow line via the at least one inlet and exits the flow line via the plurality of outlets, the cooling medium is directed towards the central radial axis of the cooling device;
 wherein the scaffold comprises the cooled filament.

15. The method of claim 14, wherein cooling the filament further comprises introducing a cooling medium into the cooling device via the at least one inlet, such that the cooling medium is directed towards the polymer filament via the plurality of outlets.

16. The method of claim 15, wherein the filament is cooled as it is extruding from the nozzle via low flow convective cooling.

17. The method of claim 15, wherein the cooling is in the +/− direction of motion on an XY plane.

18. The method of claim 15, wherein the cooling medium is a gas.

19. The method of claim 18, wherein the gas comprises nitrogen.

20. The method of claim 14, wherein the melting temperature of the at least one polymer is selected from the group consisting of: at least about 140° C., at least about 160° C., at least about 180° C., and at least about 200° C.

21. A precision extrusion deposition system comprising:
 a polymer extruder;
 a motion controller adapted and configured to move the polymer extruder along at least an X axis and a Y axis; and
 the device for cooling a polymer filament mounted over the polymer extruder without interfacing or interfering with flow of the polymer filament, the device comprising:
  a flow line comprising a continuous loop having a hollow interior, at least one inlet providing access to the hollow interior of the continuous loop, and a plurality of outlets also accessing the hollow interior of the continuous loop;
  a mounting structure for attaching the device to the polymer extruder, the mounting structure dimensioned for mounting over the polymer extruder without interfacing or interfering with flow of the polymer filament; and
  at least one support connector for securely attaching the flow line to the mounting structure;
  wherein the plurality of outlets are angled towards a central radial axis of the device, such that when a cooling medium is introduced into the hollow interior of the continuous loop of the flow line via the at least one inlet and exits the flow line via the plurality of outlets, the cooling medium is directed towards the central radial axis of the device;

wherein the device is arranged so that the a first opposing pair of the four outlets are parallel to the X axis and a second opposing pair of the four outlets is parallel to the Y axis.

22. The system of claim 21, wherein the polymer extruder includes at least one heater adapted and configured to heat a polymer above a temperature selected from the group consisting of: at least about 140° C., at least about 160° C., at least about 180° C., and at least about 200° C.

23. The system of claim 21, wherein the polymer dispenser is thermally isolated from the flow line and the plurality of outlets.

* * * * *